(12) United States Patent
Nishimura et al.

(10) Patent No.: US 7,338,706 B2
(45) Date of Patent: *Mar. 4, 2008

(54) RESIN COMPOSITION FOR CAPSTOCK

(75) Inventors: Riichi Nishimura, League City, TX (US); Takahiko Sugaya, Houston, TX (US)

(73) Assignees: Kaneka Corporation, Osaka-Shi (JP); Kaneka Texas Corporation, Pasadena, TX (US)

( * ) Notice: Subject to any disclaimer, the term of this patent is extended or adjusted under 35 U.S.C. 154(b) by 49 days.

This patent is subject to a terminal disclaimer.

(21) Appl. No.: 10/311,316

(22) PCT Filed: Apr. 23, 2002

(86) PCT No.: PCT/US02/11849

§ 371 (c)(1),
(2), (4) Date: Jun. 30, 2003

(87) PCT Pub. No.: WO02/085620

PCT Pub. Date: Oct. 31, 2002

(65) Prior Publication Data

US 2004/0102578 A1 May 27, 2004

Related U.S. Application Data

(60) Provisional application No. 60/285,225, filed on Apr. 23, 2001.

(51) Int. Cl.
*B32B 5/16* (2006.01)
(52) U.S. Cl. .................. 428/327; 525/80; 525/85; 525/70; 524/516; 524/518
(58) Field of Classification Search .......... 525/70, 525/80, 85; 524/516, 518; 428/327
See application file for complete search history.

(56) References Cited

U.S. PATENT DOCUMENTS

| 3,649,337 | A | | 3/1972 | Johnson et al. |
|---|---|---|---|---|
| 4,198,520 | A | | 4/1980 | Samour et al. |
| 4,773,957 | A | * | 9/1988 | Briggs ................. 156/310 |
| 5,290,857 | A | | 3/1994 | Ashida et al. |
| 5,318,737 | A | | 6/1994 | Trabert et al. |
| 5,442,012 | A | * | 8/1995 | Kempner et al. ......... 525/71 |
| 6,534,592 | B1 | * | 3/2003 | Chou et al. ............. 525/70 |
| 6,555,245 | B2 | * | 4/2003 | Tajima et al. .......... 428/520 |
| 6,773,821 | B2 | * | 8/2004 | Tajima et al. .......... 428/520 |
| 6,811,874 | B2 | * | 11/2004 | Tanaka et al. .......... 428/370 |
| 6,841,622 | B2 | * | 1/2005 | Kasai .................. 525/222 |
| 2004/0112994 | A1 | * | 6/2004 | Tucker et al. ............ 241/1 |
| 2005/0095267 | A1 | * | 5/2005 | Campbell et al. ........ 424/425 |

FOREIGN PATENT DOCUMENTS

WO    WO 00/08098    2/2000

* cited by examiner

*Primary Examiner*—Jeffrey Mullis
(74) *Attorney, Agent, or Firm*—Kratz, Quintos & Hanson, LLP

(57) ABSTRACT

A resin composition for capstock, comprising 100 to 30 parts by weight of an impact resistance modifier having a multi-layer structure, and 0 to 70 parts by weight of a methyl methacrylate (co)polymer containing 50 to 100% by weight of methyl methacrylate and 50 to 0% by weight of a monomer which is copolymerizable therewith, wherein the total amount of the impact resistance modifier and the methyl methacrylate (co)polymer is 100 parts by weight, wherein the outer layer of said impact resistance modifier and/or said methyl methacrylate copolymer is copolymerized with 0.5 to 40% by weight of a reactive monomer based on the total amount of the impact resistance modifier and the methyl methacrylate (co)polymer as a polymer component, and wherein the homopolymer of said reactive monomer has an SP value of 9.8 $(cal/cm^3)^{1/2}$ or more.

11 Claims, No Drawings

RESIN COMPOSITION FOR CAPSTOCK

This application is 35 U.S.C. 371 national stage application of PCT/US02/11849, filed Apr. 23,2002, which claims priority under 35 U.S.C. 120 of provisional U.S. application Ser. No. 60/285,225, filed Apr. 23, 2001.

FIELD OF THE INVENTION

The present invention relates to a resin composition for capstock comprising an impact resistance modifier having a multilayer structure. Specifically, the present invention relates to a resin composition for capstock having excellent impact resistance, weather resistance and processability and low gloss.

BACKGROUND OF THE INVENTION

Acrylic resins are well known to have excellent weather resistance. By making use of this characteristic, they are used as a capstock for a material requiring weather resistance. For example, U.S. Pat. No. 4,198,520 discloses improvement of weather resistance of the surface of a molding made of a material inferior in weather resistance such as ABS resin, PVC resin or the like by using an acrylic resin as a capstock for the surface. U.S. Pat. No. 5,318,737 and WO00/08098 discloses preparation of an acrylic resin composition suited for use as a capstock excellent in weather resistance and impact resistance by adding a rubber component to an acrylic resin.

However, acrylic resins are fragile materials so that addition of a large amount of rubber thereto is necessary for attaining impact resistance enough for satisfying the market demand, which leads to a deterioration in processability and surface hardness. A capstock well balanced between impact resistance and processability does not exist at present.

DISCLOSURE OF THE INVENTION

An object of the present invention is to provide, under the above situations, a capstock having excellent impact resistance, weather resistance, surface hardness and processability which cannot so far be attained by the conventional acrylic resins.

The present inventors have carried out an extensive investigation. As a result, it has been found that a capstock having excellent impact resistance, weather resistance, processability and surface hardness can be obtained by copolymerizing a so-called polar monomer with, in an acrylic resin composition comprising an impact resistance modifier, the outer layer of the impact resistance modifier and/or the acrylic copolymer. Thus the present invention has been completed.

Specifically, the present invention relates to:

(1) A resin composition for capstock, comprising:
100 to 30 parts by weight of an impact resistance modifier having a multilayer structure, and
0 to 70 parts by weight of a methyl methacrylate (co) polymer containing 50 to 100% by weight of methyl methacrylate and 50 to 0% by weight of a monomer which is copolymerizable therewith,
wherein the total amount of the impact resistance modifier and the methyl methacrylate (co)polymer is 100 parts by weight,
wherein the outer layer of said impact resistance modifier and/or said methyl methacrylate copolymer is copolymerized with 0.5 to 40% by weight of a reactive monomer based on the total amount of the impact resistance modifier and the methyl methacrylate (co) polymer as a polymer component, and
wherein the homopolymer of said reactive monomer has an SP value of 9.8 $(cal/cm^3)^{1/2}$ or more.

(2) The resin composition according to (1), wherein the outer layer of said impact resistance modifier and/or said methyl methacrylate (co)polymer is copolymerized with 1 to 20% by weight of the reactive monomer based on the total amount of the impact resistance modifier and the methyl methacrylate (co)polymer.

(3) The resin composition according to (1), wherein the SP value of the homopolymer of the reactive monomer is 10.8 $(cal/cm^3)^{1/2}$ or more.

(4) The resin composition according to (1), wherein the impact resistance modifier and the methyl methacrylate (co)polymer are contained in 80 to 40 parts by weight and 20 to 60 parts by weight, and the total amount thereof is 100 parts by weight.

(5) The resin composition according to (1), wherein the reactive monomer is one or at least two of a monomer having a nitrile group, an epoxy group, a glycidyl group, a hydroxyl group, a carboxylic acid group, an aldehyde group, an amino group or an amide group.

(6) The resin composition according to (1), wherein the impact resistance modifier has a two-layer structure and is obtained by polymerizing a monomer mixture containing a (meth)acrylic ester and a copolymerizable monomer in the presence of a crosslinked acrylic rubber.

(7) The resin composition according to (1), wherein the impact resistance modifier has a three-layer structure and is obtained by polymerizing an alkyl acrylate, a copolymerizable monomer and a crosslinking monomer in the presence of a polymer obtained by polymerizing methyl methacrylate, a copolymerizable monomer and a crosslinking monomer and then polymerizing a monomer mixture containing a (meth)acrylic ester and a copolymerizable monomer in the presence of the resulting two-layer polymer.

(8) The resin composition according to (1), wherein a weight ratio of the crosslinked rubber portion and the outer layer portion of said impact resistance modifier according to (6) or (7) is 15/85 to 95/5.

(9) The resin composition according to (1), wherein the capstock is a capstock for a siding panel made of polyvinyl chloride.

(10) A siding panel obtained by extrusion-molding the resin composition according to (1) as a capstock and a polyvinyl chloride resin as a substrate.

(11) A siding panel obtained by extrusion-molding the resin composition according to (1) as a capstock and a polyvinyl chloride resin as a substrate using a multimanifold die.

BEST MODE FOR CARRYING OUT THE INVENTION

Hereinafter, the terms "part(s) by weight" and "% by weight" are simply referred to as "part(s)" and "%", respectively, unless otherwise indicated.

The methyl methacrylate (co)polymer can be obtained by copolymerizing methyl methacrylate with a monomer which is copolymerizable therewith. Furthermore, it is obtained by copolymerizing 50 to 100% of methyl methacrylate with 0 to 50% of a monomer which is copolymerizable therewith. Amounts of methyl methacrylate less than 50% are insufficient for bringing about weather resistance improving effects of a capstock molding so that they are not preferred.

The amount of methyl methacrylate is preferably 60 to 98%, more preferably 75 to 90%. Examples of the monomer which is copolymerizable with methyl methacrylate include an aromatic vinyl, an acrylic ester, a methacrylic ester other than methyl methacrylate, and the like.

The aromatic vinyl includes styrene, α-methylstyrene, chlorostyrene and the like.

The acrylic ester includes ethyl acrylate, butyl acrylate, n-octyl acrylate, 2-ethylhexyl acrylate.

The methacrylic ester includes ethyl methacrylate, butyl methacrylate, n-octyl methacrylate, 2-ethylhexyl methacrylate and the like.

They may be used either alone or in combination.

The copolymer of methyl methacrylate and a monomer which is copolymerizable therewith is obtained by emulsion polymerization, suspension polymerization, bulk polymerization, solution polymerization or the like. Among these, bulk polymerization is especially preferred because of a small content of impurities in the polymer.

The impact resistance modifier having a multilayer structure is a multilayer polymer obtained by one-stage or at least two-stage polymerization of a vinyl monomer in the presence of rubbery polymer particles. Examples of the rubbery polymer include acrylic rubber, diene rubber, silicone rubber and the like. Examples of the diene rubber include polybutadiene rubber, isoprene rubber, SBR, NBR and the like. Among these, acrylic rubber is preferred because they do not deteriorate the weather resistance of capstock obtained using it and the cost is low. Examples of the acrylic rubber include n-butyl acrylate rubber, n-octyl acrylate rubber, 2-ethylhexyl acrylate rubber and the like. As these rubbers, crosslinked rubber is usually employed. A compound used for the formation of the crosslinked structure is preferably allyl methacrylate, allyl acrylate, diallyl maleate, diallyl fumarate, diallyl itaconate, monoallyl maleate, butadiene, divinyl benzene or the like. They are used either alone or in combination.

The impact resistance modifier having a multilayer structure is usually prepared by carrying out one-stage or at least two-stage polymerization of 85 to 10% of a vinyl monomer in the presence of 15 to 90% of crosslinked rubber particles. The amount of the crosslinked rubber particles is preferably 25 to 80%, more preferably 30 to 70%. Amounts within this range are preferred from the viewpoints of processability and weather resistance. The crosslinked rubber particles may contain, as the core, a rigid polymer in their inner layers. Examples of the vinyl monomer to be polymerized in the presence of rubbery polymer particles include methyl methacrylate, ethyl methacrylate, methyl acrylate, ethyl acrylate, butyl acrylate, styrene and the like. Any one of emulsion polymerization, suspension polymerization, bulk polymerization and solution polymerization can be employed for polymerization. Among these, emulsion polymerization is preferred because it facilitates control of the structure of the polymer.

The SP value of the homopolymer is calculated in accordance with the equation as described in The Society of Polymer Science, Japan, 2nd Polymer Material Forum, Gist of Lectures, p. 167 (1993). In this method, the calculation method of Small (P. A. Small; *J. Appl. Chem.*, 3, 71 (1953)) which is popularly known has been corrected so that the SP value approximates the found value.

Examples of the reactive monomer in which the homopolymer has an SP value of 9.8 $(cal/cm^3)^{1/2}$ or more of the present invention include acrylonitriler methacrylonitrile, glycidyl methacrylate, 2-hydroxyethyl acrylate, 2-hydroxyethyl methacrylate, 4-hydroxybutyl acrylate, acrylic acid, methacrylic acid and the like. They may be used either alone or in combination. When the reactive monomer is used for the outer layer of the impact resistance modifier, it may be copolymerized uniformly with the whole outer layer, or the outer layer may be divided into plural layers, one to be copolymerized with the reactive monomer and the other not to be copolymerized with the reactive monomer. Alternatively, copolymerization may be conducted while applying a concentration gradient. The term "outer layer" as used herein means a layer surrounding the crosslinked rubber. When the above-described monomer is used for the methyl methacrylate (co)polymer, on the other hand, it may be copolymerized with the whole (co)polymer or the (co)polymer may be a mixture of a portion to be copolymerized with the monomer and another portion not to be copolymerized with the monomer.

The reactive monomer of the present invention is used for the methyl methacrylate (co)polymer and/or the outer layer of the impact resistance modifier. Use of it for either one is preferred for attaining a low gloss. The gloss is presumed to become low, because when it is used for either one, compatibility between methyl methacrylate (co)polymer and the outer layer of the impact resistance modifier lowers, thereby lowering dispersibility of the impact resistance modifier in the methyl methacrylate copolymer, causing coagulation and inevitably making the surface irregular. Excessive lowering in the compatibility is not preferred because it induces deterioration in impact resistance.

When the content of the reactive monomer of the present invention is less than 0.5%, effects for improving impact resistance are not sufficient. Contents exceeding 40%, on the other hand, are not preferred from the viewpoint of weather resistance.

The SP value of the homopolymer is preferably 9.8 $(cal/cm^3)^{1/2}$ or more, more preferably 10.8 $(cal/cm^3)^{1/2}$ or more. The amount of the reactive monomer is preferably 0.5 to 40%, more preferably 1 to 20%.

Various thermoplastic resins such as a polyvinyl chloride resin, an ABC resin and the like are employed as a substrate for capstock. Among these, the polyvinyl chloride resin is preferred from the viewpoint of processability and weather resistance.

Siding sheets may be processed by laminating extrusion through a popularly used die such as feed block die or multimanifold die. The multimanifold die is preferred because use of it permits production of a good sheet even if a capstock and a substrate which are different in viscosity are used in combination, and facilitates control of thickness of the sheet.

There is no particular limitation imposed on a process for preparing the acrylic resin composition of the present invention. An acrylic resin composition containing crosslinked rubber particles may be polymerized in one operation, or an acrylic resin may be mixed with an impact resistance modifier. Additives such as an antioxidant, light stabilizer, lubricant, pigment and the like may be added as needed.

The present invention will hereinafter be described based on Examples and Comparative Examples. However, the present invention is not limited thereto.

EXAMPLE 1

Preparation of Methyl Methacrylate Copolymer:

In a reactor equipped with a stirrer were charged 200 parts of water and 0.5 part of sodium dioctylsuccinate. After oxygen was removed from the space and water in the reactor by nitrogen purging, the mixture was heated to 70° C. under stirring. To the reaction mixture were added 0.004 part of sodium ethylenediaminetetraacetate, 0.002 part of ferrous sulfate 7 hydrate, and 1 part of sodium formaldehyde sulfoxylate. Then, a mixture of 73 parts of methyl methacrylate, 15 parts of butyl acrylate, 12 parts of acrylonitrile and 1 part of t-butyl hydroperoxide was added continuously over 4 hours. Two hours after addition was started, 0.5 part of sodium dioctylsuccinate was added in one operation. After completion of the continuous addition of the mixture, 0.1 part of t-butyl hydroperoxide and 0.1 part of sodium formaldehyde sulfoxylate were added. Fifty minutes after completion of the addition, 0.1 part of t-butyl hydroperoxide was added. Ten minutes after that, 0.1 part of sodium formaldehyde sulfoxylate was added. After completion of the addition, the mixture was maintained at the same temperature for 1 hour to complete the polymerization. The methacrylic acid copolymer latex thus obtained was subjected to salting-out and coagulation, heat treatment and drying in a known manner, whereby a methyl methacrylate copolymer was obtained as white powder. A monomer-to-polymer conversion ratio was 96%.

Preparation of Two-layer Impact Resistance Modifier:

(a) Preparation of Rubbery Polymer

The mixture described below was charged in a glass reactor. While stirring in a nitrogen gas stream, the mixture was heated to 50° C. A monomer mixture of 100 parts of n-butyl acrylate, 1 part of allyl methacrylate and 0.1 part of cumene hydroperoxide was added over 4 hours. Simultaneously with the addition of the monomer mixture, a 5% aqueous solution of 2 parts of potassium stearate was added continuously over 4 hours. After the addition was completed, stirring was continued for 5 hours to complete the polymerization. A monomer-to-polymer conversion ratio was 97% and the polymer thus obtained was found to have an average particle size of 1300 Å.

| Mixture: | (parts) |
|---|---|
| Deionized water | 180 |
| Potassium stearate | 0.1 |
| Formaldehyde sodium sulfoxylate | 0.2 |
| Sodium ethylenediaminetetraacetate | 0.01 |
| Ferrous sulfate heptahydrate | 0.005 |

(b) Preparation of Outer Layer

In a glass reactor were charged 70 parts (as a solid content) of the crosslinked rubbery polymer latex obtained in (a), 0.08 part of sodium formaldehyde sulfoxylate, 0.02 part of sodium ethylenediaminetetraacetate and 0.01 part of ferrous sulfate heptahydrate. At 50° C., the aqueous dispersion was stirred under heating in a nitrogen gas stream. Over one hour, 26 parts of methyl methacrylate and 4 parts of butyl acrylate, as monomer components for graft polymerization, and, as a polymerization initiator, 0.05 part of cumene hydroperoxide were added continuously. After completion of the addition, 0.01 part of cumene hydroperoxide was added. Stirring was continued for 2 hours to complete the polymerization. A monomer-to-polymer conversion ratio was 98%. The graft copolymer latex having a multilayer structure thus obtained was then subjected to salting-out and coagulation, heat treatment and drying in a known manner to thereby obtain a two-layer impact resistance modifier as white powder.

Preparation of Resin Composition:

To 45 parts of the resulting impact resistance modifier and 55 parts of the methyl methacrylate copolymer, 100 parts in total, were added 0.2 part of an olefin lubricant ("ACPE-629A", manufactured by Allied Signal Inc.) and 1 part of an ultraviolet absorber ("TINUVIN-P", manufactured by Ciba Specialty Chemicals). The resulting mixture was kneaded in a twin-screw kneader, followed by pelletization. From the pellets, a sheet of 40 mil thick was formed by a T-die twin screw extruder.

The Gardner impact resistance (G.I., unit: inch·lb/mil) at 23° C. of the sample thus obtained was measured in accordance with ASTM D4226-93. The results are shown in Table 1.

EXAMPLE 2

In the same manner as in Example 1 except that the composition of the monomer mixture for a methyl methacrylate copolymer was changed to 73 parts of methyl methacrylate, 15 parts of butyl acrylate and 12 parts of glycidyl methacrylate and the composition of the monomer mixture for the outer layer of an impact resistance modifier was changed to 25 parts of methyl methacrylate and 5 parts of acrylonitrile, a methyl methacrylate copolymer and an impact resistance modifier were prepared, followed by pelletization and formation of a sheet. The sheet was evaluated in the same manner as in Example 1 and the results are shown in Table 1.

EXAMPLE 3

In the same manner as in Example 2 except that the composition of the monomer mixture for a methyl methacrylate copolymer was changed to 73 parts of methyl methacrylate, 15 parts of butyl acrylate and 12 parts of 2-hydroxyethyl acrylate, a methyl methacrylate copolymer and an impact resistance modifier were prepared, followed by pelletization and formation of a sheet.

The sheet was evaluated in the same manner as in Example 1 and the results are shown in Table 1.

EXAMPLE 4

In the same manner as in Example 1, a methyl methacrylate copolymer was prepared, while in the same manner as in Example 2, an impact resistance modifier was prepared. They were kneaded and pelletized in the same manner as in Example 1, followed by formation of a sheet.

The sheet was evaluated in the same manner as in Example 1 and the results are shown in Table 1.

EXAMPLE 5

(a) Preparation of Rubbery Polymer

A rubbery polymer was prepared in the same manner as in Example 1.

(b) Polymerization of Outer Layer

In a glass reactor were charged 32 parts (as a solid content) of the crosslinked rubbery polymer latex obtained in (a), 0.17 part of sodium formaldehyde sulfoxylate, 0.044 part of sodium ethylenediaminetetraacetate and 0.022 part of ferrous sulfate heptahydrate. At 50° C., the aqueous dispersion was stirred under heating in a nitrogen gas stream. Then, as monomer components for graft polymerization, 48 parts of methyl methacrylate, 10 parts of butyl acrylate and 10 parts of acrylonitrile, and, as a polymerization initiator, 0.13 part of cumene hydroperoxide were added continuously over 2.5 hours. After completion of the addition, 0.17 part of cumene hydroperoxide and 0.2 part of sodium formaldehyde sulfoxylate were added. One hour thereafter, 0.17 part of cumene hydroperoxide and 0.2 part of sodium formaldehyde sulfoxylate were added. Stirring was continued for 2 hours to complete the polymerization. A monomer-to-polymer conversion ratio was 96%. The graft copolymer latex having a multilayer structure thus obtained was then subjected to salting-out and coagulation, heat treatment and drying in a known manner to thereby obtain a white powdery product.

Preparation of Resin Composition:

To 100 parts of the resulting impact resistance modifier were added 0.2 part of an olefin lubricant ("ACPE-629A", manufactured by Allied Signal Inc.) and 1 part of an ultraviolet absorber ("TINUVIN-P", manufactured by Ciba Specialty Chemicals), while not adding a methyl methacrylate copolymer. In the same manner as in Example 1, the resulting mixture was kneaded in a twin-screw kneader, followed by pelletization and formation of a sheet.

The sheet was evaluated in the same manner as in Example 1 and the results are shown in Table 1.

COMPARATIVE EXAMPLE 1

In the same manner as in Example 1 except that the composition of the mixture for a methyl methacrylate copolymer was changed to 85 parts of methyl methacrylate and 15 parts of butyl acrylate, a methyl methacrylate copolymer and an impact resistance modifier were prepared, followed by pelletization and formation of a sheet.

The sheet was evaluated in the same manner as in Example 1 and the results are shown in Table 1.

Preparation of Impact Resistance Modifier:

(a) Preparation of Rubbery Polymer

A rubbery polymer was prepared in the same manner as in Example 1.

(b) Preparation of Outer Layer

In a glass reactor were charged 60 parts (as a solid content) of the crosslinked rubbery polymer latex obtained in (a), 0.11 part of sodium formaldehyde sulfoxylate, 0.026 part of sodium ethylenediaminetetraacetate and 0.013 part of ferrous sulfate heptahydrate. At 50° C., the aqueous dispersion was stirred under heating in a nitrogen gas stream. Then, as monomer components for graft polymerization, 33 parts of methyl methacrylate and 7 parts of acrylonitrile and, as a polymerization initiator, 0.07 part of cumene hydroperoxide were added continuously over 2 hours. After completion of the addition, 0.17 part of cumene hydroperoxide and 0.2 part of sodium formaldehyde sulfoxylate were added. One hour later, 0.17 part of cumene hydroperoxide and 0.2 part of sodium formaldehyde sulfoxylate were added. Stirring was continued for 1 hour to complete the polymerization. A monomer-to-polymer ratio was 97%. The graft copolymer latex having a multilayer structure thus obtained was then subjected to salting-out and coagulation, heat treatment and drying in a known manner to thereby obtain a white powdery product.

Preparation of Resin Composition:

As in Example 1, a mixture obtained by adding 0.2 part of an olefin lubricant ("ACPE-629A", manufactured by Allied Signal Inc.) and 1 part of an ultraviolet absorber ("TINUVIN-P", manufactured by Ciba Specialty Chemicals) to 47.5 parts of a methyl methacrylate copolymer and 52.5 parts of the resulting impact resistance modifier was kneaded in a twin-screw kneader, followed by pelletization and formation of a sheet.

TABLE 1

|  | Ex. 1 | Ex. 2 | Ex. 3 | Ex. 4 | Ex. 5 | Comp. Ex. 1 |
|---|---|---|---|---|---|---|
| Monomer | AN | AN & GMA | AN & HA | AN | AN |  |
| SP value (cal/cm$^3$) | 14.0 | 14.0 & 11.9 | 14.0 & 11.5 | 14.0 | 14.0 |  |
| Amount (%) | 6.6 | 6.6 & 2.3 | 6.6 & 2.3 | 6.6 & 2.3 | 10.0 | 0 |
| G. I. (inch · lb/mil) | 0.86 | 0.84 | 0.99 | 0.80 | 1.24 | 0.10 |

AN: Acrylonitrile
GMA: Glycidyl methacrylate
HA: 2-Hydroxyethyl acrylate

EXAMPLE 6

An impact resistance modifier similar to that used in Example 2 and as a methyl methacrylate copolymer, "ACRYLITE M-30-003" (trade name; manufactured by CYRO Industries) were used. In the same manner as in Example 1, 55 parts of the methyl methacrylate copolymer and 45 parts of the impact resistance modifier were pelletized, followed by formation into a sheet. The sheet was evaluated in the similar manner as in Example 1 and the results are shown in Table 2.

EXAMPLE 7

As a methyl methacrylate copolymer, "ACRYLITE M-30-003" (trade name; manufactured by CYRO Industries) was used as in Example 6.

The sheet was evaluated in the same manner as in Example 1 and the results are shown in Table 2.

EXAMPLE 8

As a methyl methacrylate copolymer, "ACRYLITE M-30-003" (trade name; manufactured by CYRO Industries) was used as in Example 6.

Preparation of Impact Resistance Modifier:

(a) Preparation of Rubbery Polymer

A rubbery polymer was prepared in the same manner as in Example 1.

(b) Preparation of Outer Layer

In a glass reactor were charged 40 parts (as a solid content) of the crosslinked rubbery polymer latex obtained in (a), 0.16 part of sodium formaldehyde sulfoxylate, 0.04 part of sodium ethylenediaminetetraacetate and 0.02 part of ferrous sulfate heptahydrate. At 50° C., the aqueous dispersion was stirred under heating in a nitrogen gas stream. Then, as monomer components for graft polymerization, 49 parts of methyl methacrylate and 11 parts of acrylonitrile and, as a polymerization initiator, 0.08 part of cumene hydroperoxide were added continuously over 3 hours. After completion of the addition, 0.17 part of cumene hydroperoxide and 0.2 part of sodium formaldehyde sulfoxylate were added. One hour thereafter, 0.17 part of cumene hydroperoxide and 0.2 part of sodium formaldehyde sulfoxylate were added. Stirring was continued for 1 hour to complete the polymerization. A monomer-to-polymer conversion ratio was 96%. The graft copolymer latex having a multilayer structure thus obtained was then subjected to salting-out and coagulation, heat treatment and drying in a known manner to thereby obtain a white powdery product.

Preparation of Resin Composition:

As in Example 1, a mixture obtained by adding 0.2 part of an olefin lubricant ("ACPE-629A", manufactured by Allied Signal Inc.) and 1 part of an ultraviolet absorber ("TINUVIN-P", manufactured by Ciba Specialty Chemicals) to 21.3 parts of a methyl methacrylate copolymer and 78.7 parts of the resulting impact resistance modifier was kneaded in a twin-screw kneader, followed by pelletization and formation of a sheet.

The sheet was evaluated in the same manner as in Example 1 and the results are shown in Table 2.

EXAMPLE 9

In the same manner as in Example 6 except that the composition of the outer layer of the impact resistance modifier was changed to 25 parts of methyl methacrylate and 5 parts of glycidyl methacrylate, pelletization and sheet formation were carried out. The sheet thus obtained was evaluated in the same manner as in Example 1 and the results are shown in Table 2.

COMPARATIVE EXAMPLE 2

In the same manner as in Example 6 except that the composition of the outer layer of the impact resistance modifier was changed to 25 parts of methyl methacrylate and 5 parts of butyl acrylate, pelletization and sheet formation were carried out. The sheet thus obtained was evaluated in the same manner as in Example 1 and the results are shown in Table 2.

EXAMPLE 10

Preparation of Three-layer Impact Resistance Modifier:

(a) Preparation of Innermost Layer

In a glass reactor was charged a mixture having the below-described composition. While stirring in a nitrogen gas stream, the mixture was heated to 80° C. In the reactor was charged 20% of a mixture, as the innermost layer component, composed of 35 parts of methyl methacrylate, 0.14 part of allyl methacrylate and 0.14 part of t-butyl hydroperoxide in one operation and polymerization was conducted for 45 minutes.

| Mixture: | (parts) |
|---|---|
| Deionized water | 220 |
| Boric acid | 0.3 |
| Sodium carbonate | 0.03 |
| Sodium N-lauroylsarcosinate | 0.09 |
| Sodium formaldehyde sulfoxylate | 0.09 |
| Sodium ethylenediaminetetraacetate | 0.006 |
| Ferrous sulfate heptahydrate | 0.002 |

Over 1 hour, 80% of the remaining portion of the mixture was then added continuously. After completion of the addition, the mixture was maintained at the same temperature for 2 hours to complete the polymerization. During this time, 0.2 part of sodium N-lauroylsarcosinate was added. The polymer particles in the crosslinked methacrylic polymer latex serving as an innermost layer had an average particle size of 1600 Å (determined by making use of scattering of a light having a wavelength of 546 nm) and a monomer-to-polymer conversion ratio (preparation amount of polymer/amount of monomer charged×100) was 98%.

(b) Preparation of Rubbery Polymer

The crosslinked methacrylic polymer latex obtained above in (a) was maintained at 80° C. in a nitrogen gas stream. After addition of 0.1 part of potassium persulfate, a monomer mixed solution of 52 parts of n-butyl acrylate, 13 parts of styrene and 1 part of allyl methacrylate was added continuously over 5 hours. During the addition, 0.1 part of potassium oleate was added in 3 portions. After completion of the addition of the monomer mixed solution, 0.05 part of potassium persulfate was added further in order to complete the polymerization and the mixture was maintained for 2 hours. The polymer thus obtained had an average particle size of 2300 Å and a monomer-to-polymer conversion ratio was 99%.

(c) Preparation of Outermost Layer

After addition of 0.02 part of potassium persulfate to 75 parts of the rubbery polymer latex which had been obtained above in (b) and maintained at 80° C., a mixed solution of 20 parts of methyl methacrylate and 5 parts of acrylonitrile were added continuously over 1 hour. After completion of the addition of the monomer mixed solution, 0.02 part of potassium persulfate was added and the resulting mixture was maintained for 2 hours to thereby obtain a multilayer graft copolymer latex. The graft copolymer having a multilayer structure had an average particle size of 2530 Å and a monomer-to-polymer conversion ratio was 97%. The resulting multi-layer graft copolymer latex was subjected to salting-out and coagulation, heat treatment and drying in a known manner to thereby obtain a multilayer graft copolymer as white powder.

Preparation of Resin Composition:

The resulting impact resistance modifier (45 parts) and as a methyl methacrylate copolymer, 55 parts of ACRYLITE M-30-003" (trade name; manufactured by CYRO Industries) were used. In a similar manner to Example 1, they were pelletized, followed by formation into a sheet. The sheet was evaluated in the same manner as in Example 1 and the results are shown in Table 2.

TABLE 2

|  | Ex. 6 | Ex. 7 | Ex. 8 | Ex. 9 | Ex. 10 | Comp. Ex. 2 |
|---|---|---|---|---|---|---|
| Monomer | AN | AN | AN | GMA | AN |  |
| SP value (cal/cm³) | 14.0 | 14.0 | 14.0 | 11.9 | 14.0 |  |
| Amount used (%) | 2.3 | 3.7 | 8.7 | 2.3 | 2.3 | 0 |
| G. I. (inch · lb/mil) | 0.89 | 1.21 | 4.62 | 1.05 | 1.08 | 0.59 |

AN: Acrylonitrile
GMA: Glycidyl methacrylate

INDUSTRIAL APPLICABILITY

By using the acrylic resin composition of the present invention as a capstock, a siding panel excellent in weather resistance, impact resistance, surface hardness and processability and having a low gross can be obtained.

The invention claimed is:

1. An article of manufacture, comprising:
   a substrate; and
   a capstock laminated with said substrate, said capstock being made from a resin composition for capstock, comprising:
   80 to 40 parts by weight of an impact resistance modifier having a multilayer structure, and
   20 to 60 parts by weight of a methyl methacrylate (co)polymer containing 50 to 100% by weight of methyl methacrylate and 50 to 0% by weight of a monomer(s) which is copolymerizable therewith,
   wherein the total amount of the impact resistance modifier and the methyl methacrylate (co)polymer is 100 parts by weight,
   wherein the outer layer of said impact resistance modifier and/or said methyl methacrylate copolymer is copolymerized with 0.5 to 40% by weight of reactive monomer(s) based on the total amount of the impact resistance modifier and the methyl methacrylate (co)polymer as a polymer component,
   wherein said reactive monomer is one or more monomer(s) selected from acrylonitrile, methacrylonitrile, glycidyl methacrylate, 2-hydroxyethyl acrylate, 2-hydroxyethyl methacrylate, 4-hydroxybutyl acrylate, acrylic acid, and methacrylic acid,
   wherein the homopolymer of said reactive monomer has an SP value of 9.8 $(cal/cm^3)^{1/2}$ or more, and
   wherein the impact resistance modifier has a two-layer structure and is obtained by polymerizing a monomer mixture containing (meth)acrylic ester(s) and copolymerizable monomer(s) in the presence of a crosslinked acrylic rubber.

2. The article of manufacture according to claim 1, wherein the outer layer of said impact resistance modifier and/or said methyl methacrylate (co)polymer is copolymerized with 1 to 20% by weight of the reactive monomer based on the total amount of the impact resistance modifier and the methyl methacrylate (co)polymer.

3. The article of manufacture according to claim 1, wherein the SP value of the homopolymer of the reactive monomer is 10.8 $(cal/cm^3)^{1/2}$ or more.

4. The article of manufacture according to claim 1, wherein a weight ratio of the crosslinked rubber portion and the outer layer portion of said impact resistance modifier is 15/85 to 95/5.

5. The article of manufacture according to claim 1, wherein the substrate is a siding panel made of polyvinyl chloride.

6. The article of manufacture according to claim 1, which is a siding panel obtained by extrusion-molding said resin composition as the capstock and a polyvinyl chloride resin as the substrate.

7. The article of manufacture according to claim 1, which is a siding panel obtained by extrusion-molding said resin composition as the capstock and a polyvinyl chloride resin as the substrate using a multimanifold die.

8. The article of manufacture according to claim 1, wherein the reactive monomer is used for either the outer layer of the impact resistance modifier or the methyl methacrylate (co)polymer.

9. The article of manufacture according to claim 1, wherein the impact resistance modifier having a multilayer structure is obtained by one-stage or at least two-stage polymerization of a vinyl monomer in the presence of rubbery polymer particles.

10. An article of manufacture, comprising:
    a substrate; and
    a capstock laminated with said substrate, said capstock being made from a resin composition for capstock, comprising:
    80 to 40 parts by weight of an impact resistance modifier having a multilayer structure, and
    20 to 60 parts by weight of a methyl methacrylate (co)polymer containing 50 to 100% by weight of methyl methacrylate and 50 to 0% by weight of monomer(s) which is copolymerizable therewith,
    wherein the total amount of the impact resistance modifier and the methyl methacrylate (co)polymer is 100 parts by weight,
    wherein the outer layer of said impact resistance modifier and/or said methyl methacrylate copolymer is copolymerized with 0.5 to 40% by weight of reactive monomer(s) based on the total amount of the impact resistance modifier and the methyl methacrylate (co) polymer as a polymer component,
    wherein said reactive monomer is one or more monomer(s) selected from acrylonitrile, methacrylonitrile, glycidyl methacrylate, 2-hydroxyethyl acrylate, 2-hydroxyethyl methacrylate, 4-hydroxybutyl acrylate, acrylic acid, and methacrylic acid,
    wherein the homopolymer of said reactive monomer has an SP value of 9.8 $(cal/cm^3)^{1/2}$ or more, and
    wherein the impact resistance modifier has a three-layer structure and is obtained by the steps of:
    (1) obtaining a polymer by polymerizing methyl methacrylate, copolymerizable monomer(s) and crosslinking monomer(s);
    (2) polymerizing an alkyl acrylate, copolymerizable monomer(s) and crosslinking monomer(s) in the presence of the polymer of step (1) to yield a two layer polymer; and then
    (3) polymerizing a monomer mixture containing (meth)acrylic ester(s) and copolymerizable monomer(s) in the presence of the resulting two-layer polymer of step (2), to produce the outer layer portion of the three-layer structure.

11. The article of manufacture according to claim 10, wherein a weight ratio of the crosslinked rubber portion and the outer layer portion of said impact resistance modifier is 15/85 to 95/5.

* * * * *